(12) United States Patent
Chen

(10) Patent No.: US 11,080,102 B2
(45) Date of Patent: Aug. 3, 2021

(54) SYSTEM AND METHOD FOR DEVELOPING MODULARIZED APPLICATION

(71) Applicant: Michael Changcheng Chen, Castle Hill (AU)

(72) Inventor: Michael Changcheng Chen, Castle Hill (AU)

(*) Notice: Subject to any disclaimer, the term of this patent is extended or adjusted under 35 U.S.C. 154(b) by 8 days.

(21) Appl. No.: 16/351,781

(22) Filed: Mar. 13, 2019

(65) Prior Publication Data

US 2020/0293383 A1 Sep. 17, 2020

(51) Int. Cl.
*G06F 9/54* (2006.01)
*G06F 9/445* (2018.01)
*G06F 8/36* (2018.01)

(52) U.S. Cl.
CPC ............ *G06F 9/54* (2013.01); *G06F 9/44521* (2013.01); *G06F 9/547* (2013.01); *G06F 8/36* (2013.01)

(58) Field of Classification Search
None
See application file for complete search history.

(56) References Cited

U.S. PATENT DOCUMENTS

| | | | |
|---|---|---|---|
| 6,584,487 B1* | 6/2003 | Saboff | G06F 9/4843 718/100 |
| 7,418,435 B1* | 8/2008 | Sedlar | G06F 16/188 |
| 2005/0066306 A1* | 3/2005 | Diab | G06F 8/24 717/108 |
| 2009/0055809 A1* | 2/2009 | Campbell | G06F 8/71 717/140 |
| 2016/0149854 A1* | 5/2016 | Foti | G06F 9/542 709/223 |
| 2016/0314036 A1* | 10/2016 | Zhang | G06F 8/61 |

* cited by examiner

*Primary Examiner* — Kenny S Lin

(57) ABSTRACT

A system and method for developing modularized applications are disclosed. In one preferred embodiment, a modularized application 12' is implemented as a directory-hierarchy comprises a plurality of directories, with each directory 20 containing a module-implementation definition 22 for implementing an application module 14' for performing one of the application's tasks. Directory relationship 26, such as parent-child, is used in defining modules association for inter-module communication. In one preferred embodiment, when executing a modularized application, modules' module-implementation definitions 22A 22B are used by application runtime, for running hardware processes 24A 24B performing the modules' intended tasks, and for conducting inter-module communication 28 between hardware processes 24A 24B of associated modules 14A" 14B".

3 Claims, 6 Drawing Sheets

SYSTEM AND METHOD FOR DEVELOPING MODULARIZED APPLICATION

BACKGROUND OF THE INVENTION

The present invention relates to software application development. In particular, the present invention relates to system and method for implementing and executing modularized applications.

Using software component in application development promotes higher-level software reuse, it brings benefits to the development such as faster development cycles, lower development costs, and higher software quality. Java and .NET classes are examples of reusable software components.

Application module, or simply referred to as "module" herein, is a high-level software component, functionally for "performing a task". This contrasts with a low-level software component, such as classes in a Java library, which is for "performing a function (of a task)". One character of application module is that it exposes its attributes or parameters through the application-building environment (i.e. an IDE), where a developer can change the application's setting or behaviour by configuring these parameters. This compares to using Java or .NET classes in application development, which involves source-code level programming.

Modularized applications, or simply referred to as "applications" herein, use application modules as the application-building blocks. Modularized applications are suitable for requirements that have a series of dependent or interacting steps or tasks. Developing modularized applications typically involves assembling modules and configuring the modules' parameters in an IDE (Integrated Development Environment). Such development is easier and has fewer software defects, as it does not involve source-code-level programming.

Application runtime, or simply "runtime", is a program that provides resources and supports modularized application's execution. Through the application-runtime API, the application's implementation is translated into computer-executable instructions by application runtime, which then calls the computer's operating system (referred to as the "hardware") to execute the instructions. Runtime sometimes is also called "application container".

FIG. 1 is a functional diagram of modularized application architecture. It shows modularized application 12 can have one or more modules 14 in its structure (a.k.a. "data-processing flow"), with each module 14 performs a task in the application. Between the associated modules 14 in application 12 it can also have inter-module communications 18, which reflect the dependencies or interactions of the application's intended tasks. Runtime 10 executes modularized application 12 through application-runtime API 16, which translates the application's implementation (not shown) into hardware-executable instructions which are then executed through executes the instruction 8 on computer's hardware 6.

Development of modularized application has three phases: design, implementation, and execution. The "design" phase is where the required tasks are identified from an application's functional requirements, and modules for these tasks are selected. Inter-module communications that are related to the dependencies of the tasks, such as data and commands exchange, are also identified and specified.

The "implementation" phase is where the application's selected modules are assembled into a "runtime executable" program (referred to as the application's "implementation"). In this phase, each module is configured for its intended task in the application, inter-module communications are also established and configured.

Application's "execution" phase is where the application's implementation is executed, as computer hardware processes that perform the application's designed tasks, by a runtime.

Prior Arts

Microsoft SSIS (SQL Server Integration Services) is a specialized program for data warehousing ETL tasks. As an "application runtime", it runs a kind of modularized application, called "SSIS package". SQL Server Data Tool (SSDT) is an IDE (Integrated Development Environment) for developing SSIS packages.

FIG. 2A shows in SSDT, modules 14 are used in assembling a data-processing flow of an SSIS package, each module has an assigned task. Data-flow link 18 ("inter-module communication") associates related modules according to the required data-processing sequence.

Oracle JCAPS is a so-called "middleware" program, which is primarily used in the field of System Integration. JCAPS interface is another example of a modularized application. Developed JCAPS interfaces (as the "modularized applications") can be executed in a program called "Egate Integrator" (as the "application runtime").

FIG. 2B shows in Java NetBeans, an IDE for building JCAPS interfaces, multiple modules 14 are linked ("associated") in a "connectivity map", which is a part of an interface's implementation.

Some multimedia tools and CAD design tools such as Photoshop and AutoCAD, and Web browsers such as Firefox and Chrome, use "plugins" or "extensions" for extending the application's functions. But these applications are different from the modularized applications described above. One most significant limitation of "plugin", compared to application module described above, is that plugins work in silos, that is, they do not have interaction or communication connection between each other. As such, plugins cannot be used for flexibly assembling modularized applications that have tasks dependencies and modules interactions.

BRIEF SUMMARY OF THE INVENTION

Technical Problem

One drawback in these prior arts is that the format of their pre-built modules is proprietary, meaning modules from different vendors cannot be used in the same application development. For example, JCAPS modules cannot be used in an SSIS package, and vice versa.

Another drawback of these prior arts is that a developed application can only be executed in proprietary runtimes. For example, an SSIS package must be run in SSIS, it cannot be run in JCAPS' Logical host, or in any other third-party-developed runtime.

Yet another drawback of these prior arts is that a developed application can only be customized using vendor-specific development tools. Tools such as SSDT and Enterprise Designer are specialized tools, they can be expensive and not available in every computer. Furthermore, these tools can be complex to install and to learn.

Solution to Problem

In accordance with the present invention, a system and method for developing modularized application, comprise an abstraction layer that separates a module's implementation from the runtime, so compatible module and runtime can be independently implemented.

The system and method of the present invention use file-system directory in defining modules in the application's implementation; and use directory relationship in defining module-associations for inter-module communications. It allows building and customizing applications through simple file-system operations, because directory is a file-system feature that is universally available on every computer and directory-operations, such as "copying" and "moving" directories, are familiar to most computer users.

Accordingly, several objects and advantages of the present invention are:

To have an open format for defining modularized application implementation, so compatible modules can interoperate and can be mixed in developing applications, and such developed applications can be run by all compatible runtimes;

To enable end-users to conveniently build and customize modularized applications, using tools and features that are available in every computer, thus to avoid the cost and restrictions associated from using proprietary tools for application development.

Further objects and advantages will become apparent from a consideration of the ensuring description and drawings.

BRIEF DESCRIPTION OF THE DRAWINGS

The invention may best be understood by reference to the following description taken in conjunction with the accompanying drawings in which.

NUMERAL REFERENCES USED IN DRAWINGS

6—operating system (hardware)
8—operating system's API
10—runtime
12—modularized application (design of)
12'—modularized application (implementation of)
12"—modularized application (execution of)
14, 14A, 14B, 14R, 14F, 14W—module (design of)
14', 14A', 14B', 14R', 14F', 14W'—module (implementation of)
14", 14A", 14B", 14R", 14F", 14W"—module (execution of)
16—application-runtime API
18, 18A, 18B—inter-module communication (design of)
20, 20A, 20B, 20R, 20F, 20W—module-directory
22, 22A, 22B, 22R, 22F, 22W—module-implementation definition
22', 22A', 22B', 22R', 22F', 22W'—hardware instruction
24A, 24B, 24R, 24F, 24W—hardware process
26, 26A, 26B—directory relationship
28, 28A, 28B—inter-module communication (execution of)

DETAILED DESCRIPTION OF THE INVENTION

The present invention is fully disclosed in the following, by firstly describing the key elements that constitute to the novelty of the invention, and then illustrating the use of these novelty elements in a mock modularized application development, in each of the development phases, in accordance to one preferred embodiment of the invention.

Implementing Module Using Directory

Figure 1:
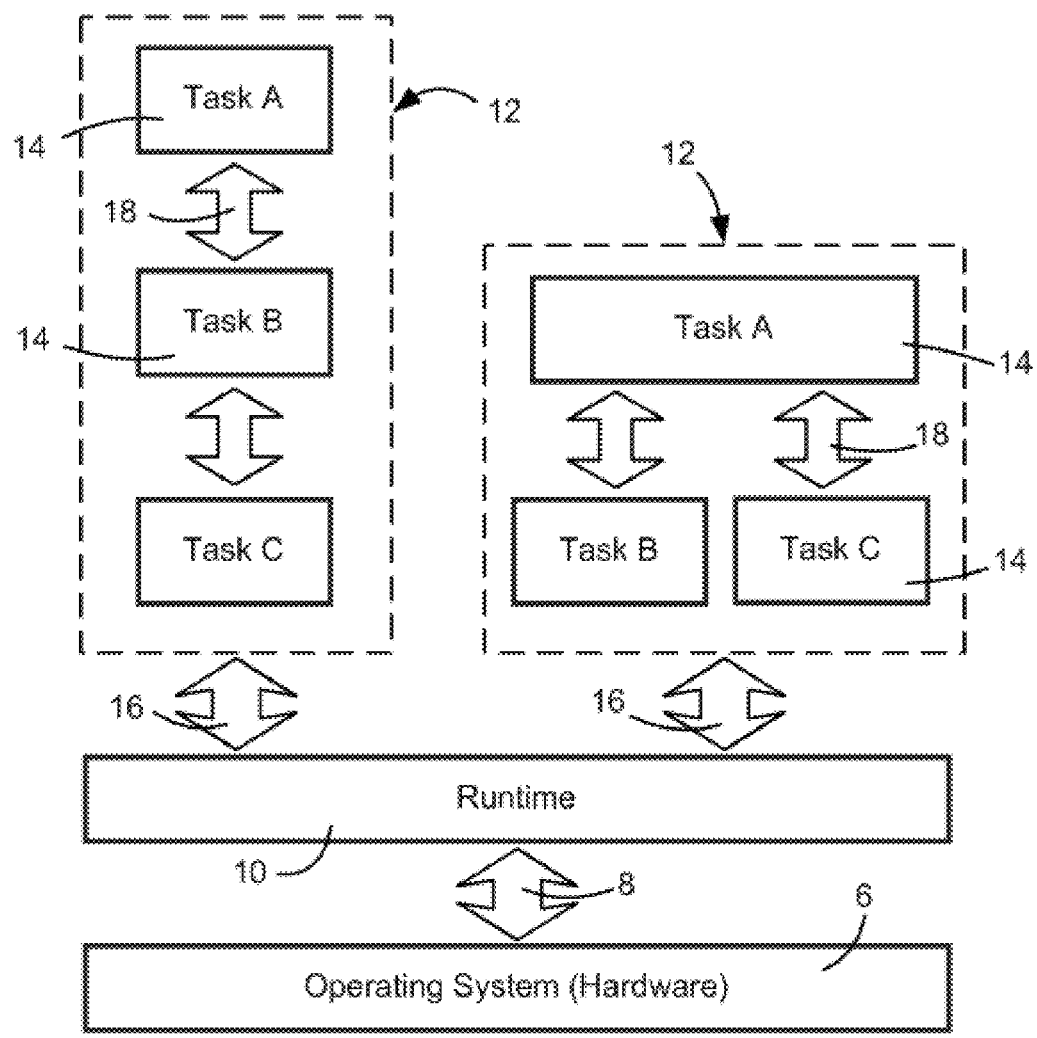
FIG. 1 is a functional diagram of modularized application architecture.
Figure 2A:
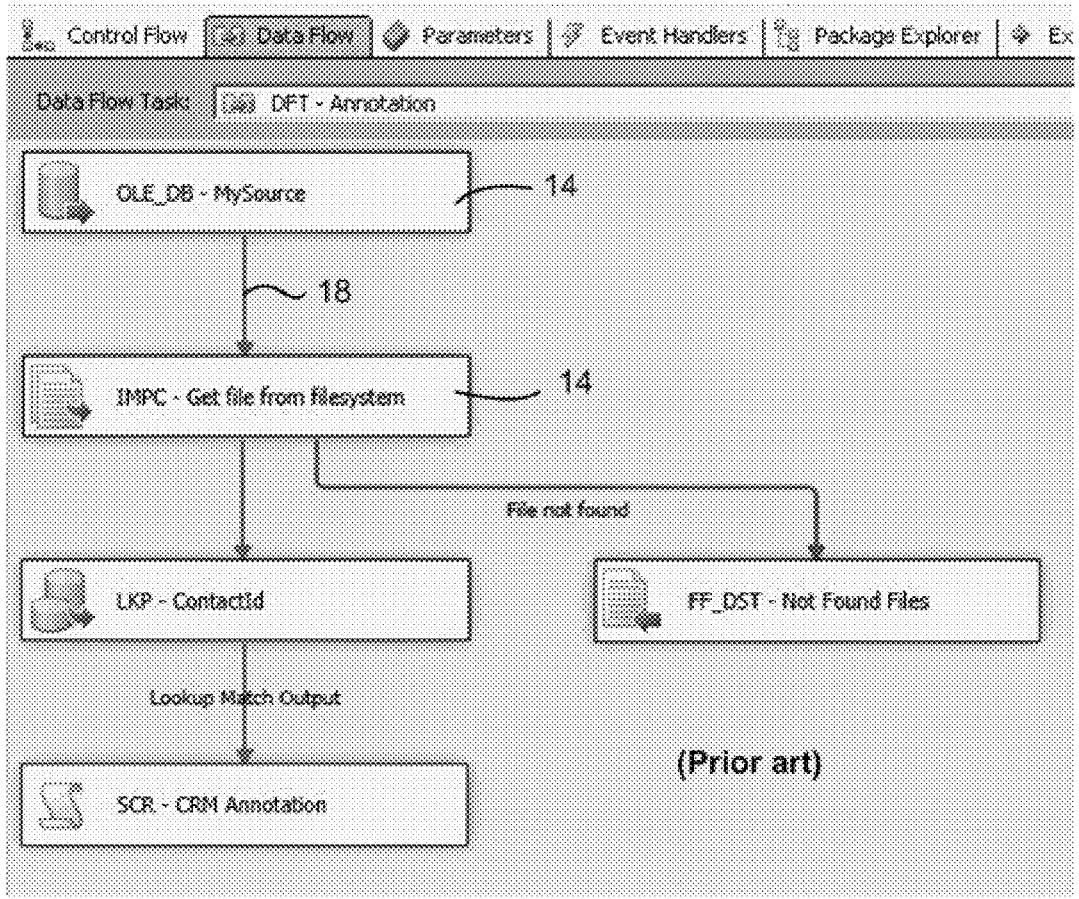
FIG. 2A is a screenshot of a prior art, Microsoft SQL Server Data Tool, showing "data flow tasks" of an SSIS package.
Figure 2B:
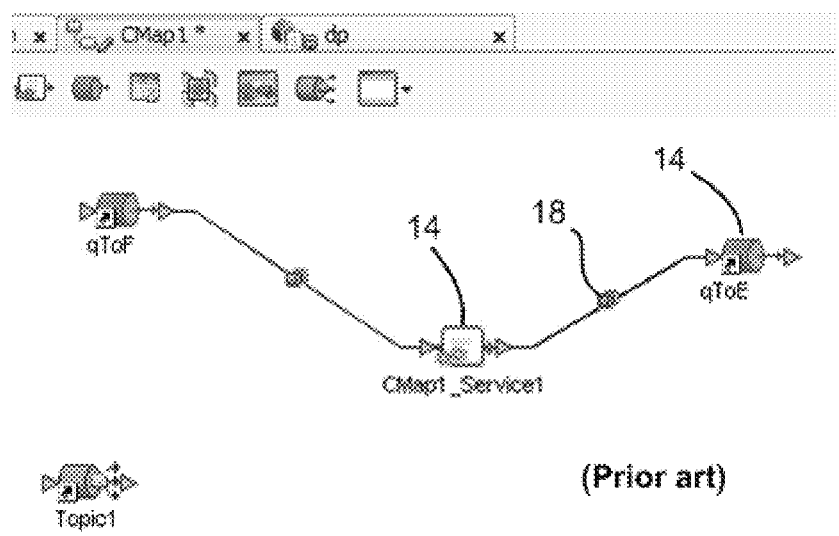
FIG. 2B is a screenshot of another prior art, a "connectivity map" of a JCAPS interface schema, as in the NetBeans IDE.
Figure 3A:
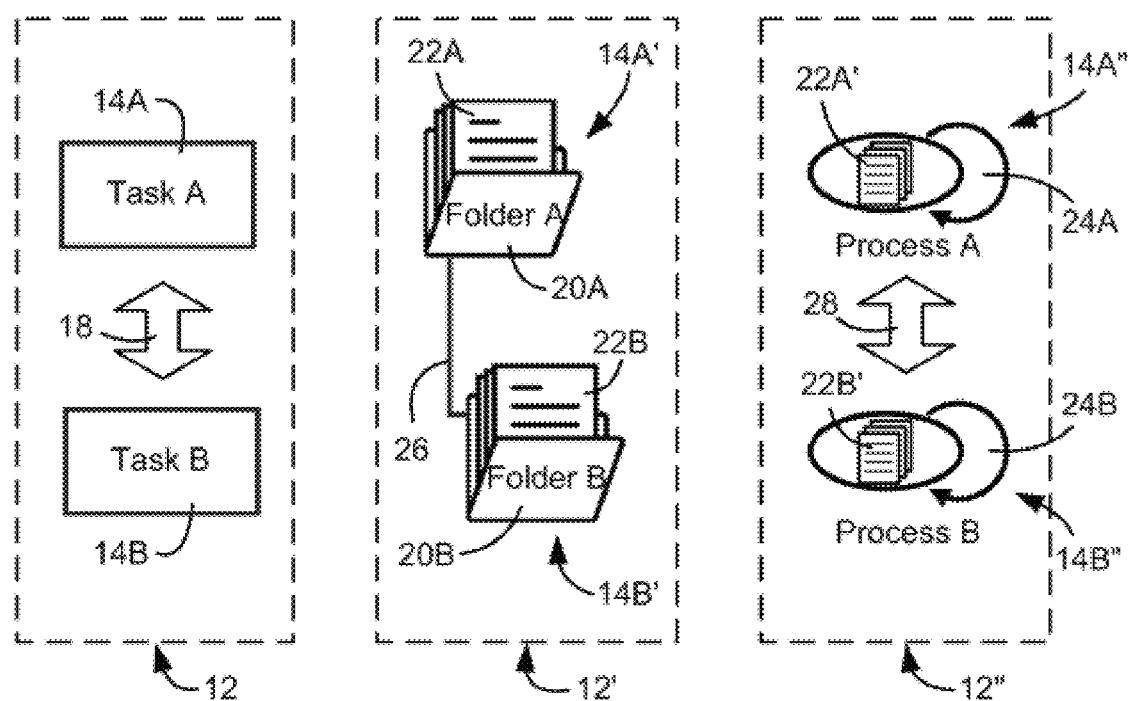
FIG. 3A is a schematic illustrates the three phases of modularized application development, of one preferred embodiment of the invention.

FIG. 3A shows a modularized application under development, in its design 12, implementation 12', and execution 12" phases, in accordance with one preferred embodiment of the present invention. It shows in FIG. 3A, file-system directories are used for constructing and representing modules in an application implementation 12'.

As FIG. 3A shows, the use of file-system directory in developing modularized application is twofold: 1) directories 20A 20B are used to contain module's implementation, which describes the details to a runtime how to perform the module's task, and 2) directory relationships 26 are used to associate modules for inter-module communications, that runtime performs when executing the application implementation.

Effectively such application implementation is a directory-hierarchy, with each directory in the hierarchy represents a module in the application. The directory used for representing a module is referred herein as "module-directory".

Since directory is a common file-system feature on all computers, using module-directories in defining application's implementation allows such implementation (format-wise) universally portable and accessible. The application in such "format" (that is, a hierarchy of directories) can then be easily copied, moved, like operating on a normal group of directories.

By encapsulating a module's implementation in its module-directory, the directory becomes "the referencing point" for a runtime to start "running" the module and ultimately performing the module's intended task. This is a significant feature because such referencing point is in a "unified open format", that is, it's a normal file-system directory which can be accessed by any program through the operating system's file-system API.

Module-Implementation Definition

Using module-directory as the accessing point to a module's implementation also allows us to define an agreement or a "contract" between the runtime and the module's implementation, about how the runtime can access the module's implementation details, and how such information can be utilized to perform the module's intended task.

"Module-implementation definition" refers to a special content in a module-directory for holding the contract, for leading runtime to derive the "implementation" of the module, that is, the hardware-executable instructions that perform the module's intended task.

Such contract enables the runtime and the module to work together, and at the same time, allows the runtime and the module to be implemented separately and independently. Such a contract can be specifically and explicitly expressed (e.g. as a web service described in WSDL), or it can also be simply implied.

For example, a contract between runtime and a module can be 1) for the runtime, is "to run every executable file placed in a module-directory", and 2) for the module's implementation, is "to place executables for performing a task in the module-directory". During running the application, when runtime executes the module, both parties will exercise the agreed logic, resulting in the runtime running the executables in the directory and performing the module's task.

In this case, the module-implementation definition is implied, referring to the module's implementation which are the executable files that reside in the module-directory. There can also be cases, such as in the later application development example of this specification, where module-implementation definition contains an explicit reference (as file-path or URL) to the actual executables, which may or may not reside in the module-directory.

Nonetheless, it can be said the content of a module-directory conclusively describes how to perform a module's task to a runtime. In other words, a module-directory includes "everything about the module a runtime needs to know". Such conclusiveness means a modularized application can be built or customized byways of normal directory operations (e.g. copy-and-paste, drag-and-drop, etc.), without the need for any specialized tools.

Modules Association and Inter-module Communication

Implementing an application also involves defining inter-module communications that reflect the application's tasks dependencies or interactions, such as data-exchange. In the present invention, this is done in two parts:

First, file-system's directory relationship is used to associate modules having inter-module communication. As shown in FIG. 3A, the "parent-child" relationship 26 of directories 20A and 20B indicates modules 14A' and 14B' in the application implementation are associated, for the designed inter-module communication 18.

Second, details of inter-module communication are defined or specified in the module-implementation definition. Such details can include, but not limited to, the module's role in communication (e.g. client or server), the direction (e.g. one-way or bidirectional), types of data or commands that are exchanged, etc, and they can be expressed implicitly or explicitly. Such information is used when runtime conducts communication during the application's execution.

Figure 3B:
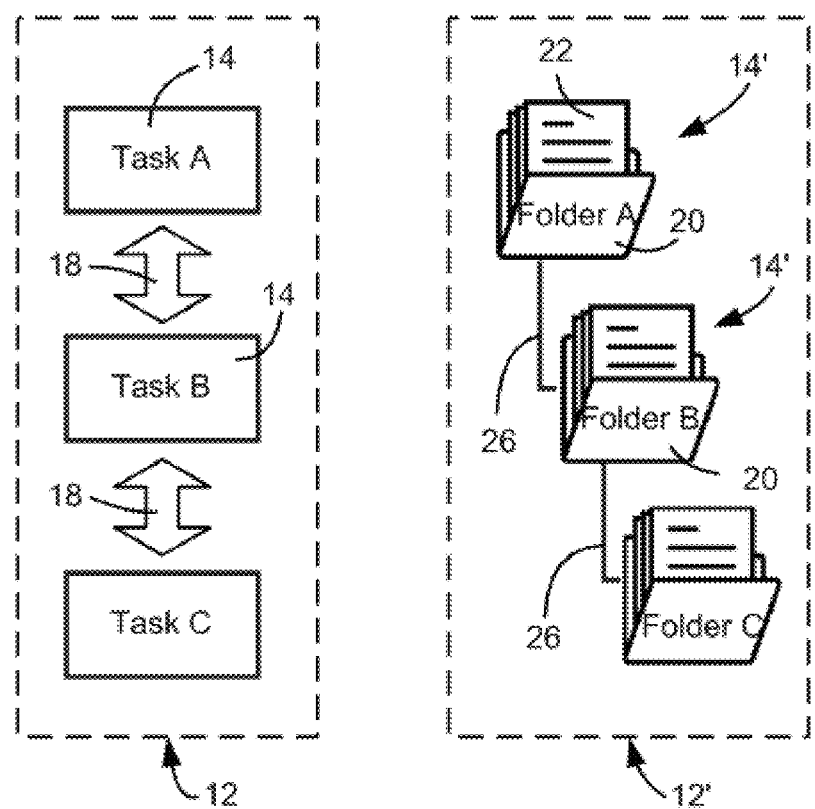
FIG. 3B-3C are schematics of modularized applications' design and their corresponding implementation, of one preferred embodiment of the invention.
Figure 3C:
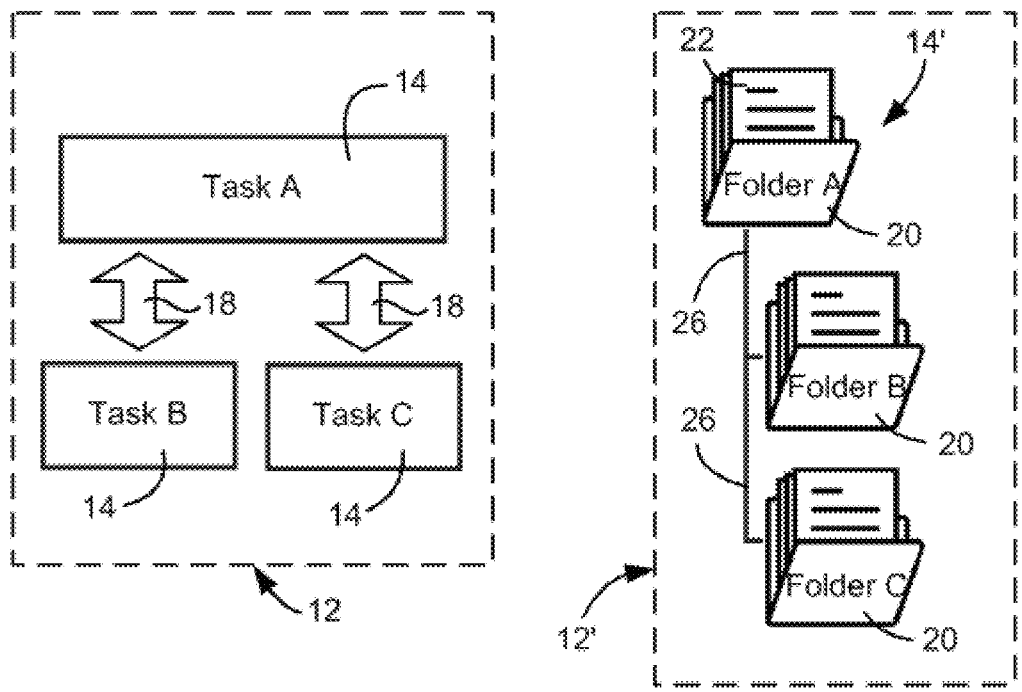

As illustrated in FIGS. 3B and 3C, inter-module communications 18 from an application's design 12 can be flexibly set up and can be easily changed in the application's implementation 12', byways of arranging module-directories relationships 26 and configuring module-implementation definition 22 that resides in module-directories 20, corresponding to the application's design.

Note there are many ways of defining directory relationship, other than nesting directories as parent-child as illustrated in FIG. 3A. For example, operating systems like Unix and Linux use "symbolic link" for referencing to another directory in the file-system. Windows has a similar feature, called a "shortcut". Another technique of relating two directories is through lookup tables, where related directories' paths can be linked as table entries. Such a lookup table can be placed inside module-implementation instructions or can be placed in somewhere the runtime can read.

Application Runtime Process

An application enters its execution phase when its implementation is executed by a runtime. FIG. 3A shows an application 12" in its execution phase, where the module-implementation definition is translated by runtime into hardware-executable instructions 22A' 22 B', which are in turn executed in computer hardware as processes (or threads) 24A 24B that perform the modules' intended tasks.

Figure 3D:
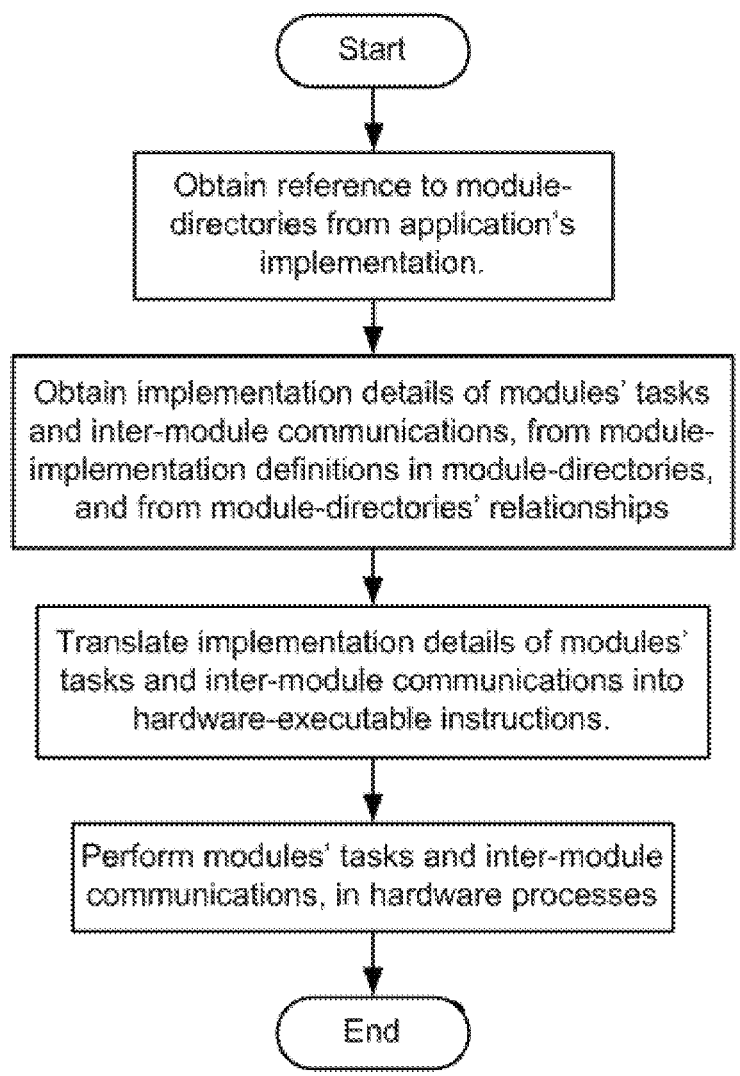
FIG. 3D is a flowchart of the runtime process for running an application.

FIG. 3D is a flowchart of runtime process executing an application. It's highlighted in the flowchart how module-directories (as in the application's implementation) are used to derive detailed module-implementation information, which is subsequently used for running module's intended tasks and communications, in computer hardware processes.

As being illustrated, the present invention has many advantages over prior arts. By using file-system directories in application implementation, it allows an application to be developed and customized through normal file-system directory operations, which are familiar to normal users and available on every computer. By using the module-implementation definition as an abstraction layer between a module's actual implementation and a runtime, it allows the module and the runtime to be implemented independently, possibly by different vendors, or by using different technologies, thus giving end-user more choices.

These and other advantages of the present invention become more apparent through the following example, in which we demonstrate how an application is developed, in each of the development phases. We also give details about how a runtime can be implemented to run the developed application, so a person skilled in the art can follow the example and carry out the invention.

Without any specific preference, .NET terminology are used in illustrating the example application development.

Example Application Development—The Design

Assuming we are developing a hypothetical data-processing application with the following requirement, as in Table 1.

TABLE 1

The example of application requirement.

From a given path, retrieve all 'admission records' from a set of input files, and write the retrieved records to an output file. The records in the input files are encoded in HL7.

To provide the background to people who are not familiar with the subject: HL7 is a messaging standard used in the Healthcare system integration industry. HL7 messages are text-based records used for transferring patient information between integrated health information systems. Admissions HL7 messages indicate patient's hospital admission status, and can be identified by checking an HL7 message element at address location 'EVN-1', for matching value 'AO1'.

As part of the design, it is identified that from the requirement, the application needs to perform three different tasks, in the following order:

The "Reading" task, which reads input files and parses the file content for retrieving HL7 records, output retrieved records;

The "Filtering" task, which filters the retrieved HL7 records from the input and selects only messages with a data element at "EVN-1" having the value "A01", output selected records; and The "Writing" task, which writes selected records from the input to a file of a given path.

Figure 4:
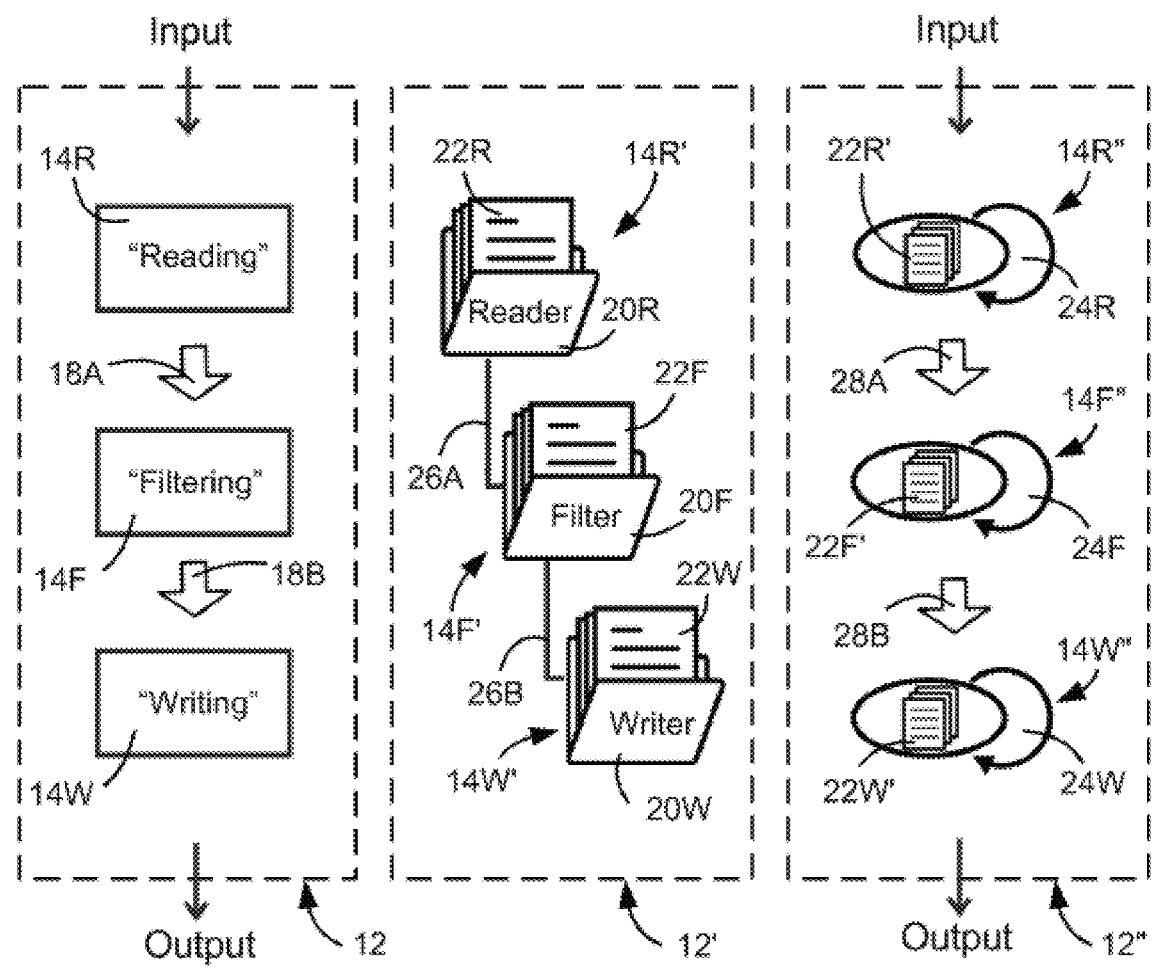
FIG. 4 is a schematic of an example application in its development phases.

FIG. 4 shows, as in the application's design 12, three modules 14R, 14F, and 14W are selected for performing these tasks. It shows in the design 12, between modules 14R-14F and 14F-14W, there are data-exchange 18A, 18B for exchanging input and output data, as part of the data-processing requirement.

Example Application Development—The Implementation

FIG. 4 shows the application's implementation 12' corresponding to the design 12. It shows three module-directories 20R, 20F and 20W are used to construct the identified modules 14R, 14F and 14W from the design 12.

In this application development example, the "module-implementation definition" is a single XML file referred to as the "step-config" file, resides in each module-directory. Each step-config file has the same XML structure that contains the configurations of the module. These files are listed as the following:

TABLE 2 step-config file content for the "Reading" module.

```
<StepConfig>
    <Handler>HL7FileReader</Handler>
    <HandlerAssembly>handlers.dll</HandlerAssembly>
    <Parameters>
        <Parameter>
            <Name>source-file-name-pattern</Name>
            <Value>*.hl7</Value>
        </Parameter>
        <Parameter>
            <Name>source-path</Name>
            <Value>D:\DATA\Reader-in</Value>
        </Parameter>
    </Parameters>
</StepConfig>
```

TABLE 3 step-config file content for the "Filtering" module.

```
<StepConfig>
    <Handler>HL7Filter</Handler>
    <HandlerAssembly>handlers.dll</HandlerAssembly>
    <Parameters>
        <Parameter>
            <Name>filtering-rule</Name>
            <Value>EVN-1=A01</Value>
        </Parameter>
    </Parameters>
</StepConfig>
```

TABLE 4 step-config file content for the "Writing" module.

```
<StepConfig>
    <Handler>HL7FileWriter</Handler>
    <HandlerAssembly>handlers.dll</HandlerAssembly>
    <Parameters>
        <Parameter>
            <Name>destination-path</Name>
            <Value>D:\DATA\Out</Value>
        </Parameter>
```

TABLE 4-continued step-config file content for the "Writing" module.

```
    </Parameters>
</StepConfig>
```

Being the "module-implementation definition", these step-config files are to provide modules' details to the runtime, so the runtime can perform the modules' intended tasks. Because this is an illustrative mock example, also for the sake of simplicity, we assume the meaning of each configuration item is understood and agreed by the application and runtime developers, as in the following configuration item interpretations.

Referring to Table 2, in our example, it specifies to the runtime how to perform the "reading" task. More specifically, the "Handler" configuration is set as "HL7FileReader" referring to a .NET class by name. The next configuration item "HandlerAssembly" refers to a .NET DLL file (called an "assembly" in .NET terms). Together these two configuration values enable the runtime to locate and load the named class in the specified DLL, for performing the HL7 file-reading task. Table 4 shows the example pseudo-code, in C #-syntax, of the class, which contains the programming steps for performing the task.

TABLE 5 pseudo code for the HL7FileReader .NET class.

```
interface IHandler
{
    void Execute(string[ ] Parameters);
}
class HL7FileReader : IHandler
{
    public void Execute(string[ ] parameters)
    {
        //read from files in the given path
        ReadFiles(parameters);
        //parse HL7 records from the read file-content
        ParseHL7Records( );
        //additional handling, e.g. inter-module communication, etc.
        TransferRetrievedRecords( );
    }
}
```

Table 2 also shows that, in the step-config file, the "parameter" XML element allows extra parameters to be set and passed to the runtime, for performing the module's task. The "source-file-name-pattern" parameter specifies the reader handler only to process files with "*.hl7" naming pattern, and the "source-path" parameter specifies the reader handler to only scan for data files in the "D:\Data\Reader-in" file location.

Similarly, configurations in Table 3 and Table 4 are pseudo instructions following the same pattern, that is, these step-config files contain a reference to the task-implementing .NET classes, and the parameters required for running each of the tasks. These are the details required for the runtime to construct the modules' task-handlers and perform the "filtering" and "writing" tasks.

It is an apparent advantage of the present invention, as illustrated in this example, that by simply changing the handler class, and/or the assembly DLL file the handler resides in, in the step-config file, one can change the module's implementation while maintaining the intended function. The implementation can be changed to a differently named class, different DLL file, or even a different technology such using Java. Such flexibility gives the user more choices in implementing and executing the modules.

Implementing Data-exchange as Inter-Module Communication

As shown in FIG. 4, module-directories 20R, 20F, 20W are nested in each other, forming a directory-hierarchy. The parent-child orders of module-directories in the hierarchy in the implementation 12' corresponds to the order of the data-processing modules 14R, 14F, 14W in design 12.

It's intended that the parent-child module-directory relationship 26A, as in FIG. 4, is used to indicate the two related modules 14R', 14F' are involved in exchanging input and output data. Furthermore, it's implied the data-exchange direction is from the "parent" module 14R' to the "child" module 14F'.

In this example, it's assumed the handlers are programmed to specifically handle HL7 data, this implies all records processed by the application are HL7 records, therefore in this example, it is not necessary to specify the data-types in the data-exchange details in the step-config files, as it's implied.

Application Development Example—The Execution

With the information contained in step-config files, and the module associations that can be derived from the directory hierarchy, the application implementation described above has the required information for a runtime to perform the modules' tasks and inter-module communications on targeted computer hardware.

FIG. 4 shows the application 12" in its execution phase. It shows running modules 14R", 14F", 14W" as hardware processes (or threads, or similar) 24R, 24F, 24W which are created by the runtime (not shown), these processes 24R, 24F, 24W are executing hardware instructions 22R', 22F', 22W' that are translated from setting values retrieved from the step-config files 22R, 22F, 22W.

In this example, the runtime uses a programming technique called "reflection". Reflection allows the runtime to dynamically load and execute code from external libraries (e.g. DLLs). Such a technique is familiar to those skilled in the art, i.e. software developers.

Specifically, for example, from the "Reading" module's implementation 14R', the runtime reads the module-implementation definition 22R, which is the step-config file as shown in Table 2; the runtime then retrieves the task-implementing .NET class named "HL7FileReder" from a DLL named "handlers.dll", and creates the "reading" hardware process 24R for running logic that is written in the HL7FileReader class (as per the pseudo code in Table 5). Similarly, the "filtering" process 24F and the "writing" process 24W can also be created by the runtime, based on their module-implementation definitions.

FIG. 4 shows inter-module communication 18A in the design 12 is performed in the application's hardware execution 12" as inter-module communication execution 28A: the output from the "Reading" module (execution) 14R" is passed to the "Filtering" module (execution) 14F" as its input. This is done by the runtime associating the two hardware processes 24R and 24F, based on the module-directory relationship 26A in application implementation 12', and conducting the required data-exchanging between the processes, based on the communication's implementation details from the module-implementation definitions 22R and 22F.

Similarly, inter-module communication 28B is also performed between the "filtering" module (execution) 14F" and the "writing" module 14W'.

As illustrated in the above example application development, using the system and method of the present invention, the application's design 12 is developed into an implementation 12', and through the application's execution 12", the designed modules' tasks and inter-module communications are performed corresponding to application's requirement.

Conclusion, Ramification, and Scope

Accordingly, the advantages of the present invention become apparent. As a novel application development system and method, it allows implementing a modularized application physically as a directory hierarchy with module-directories.

As directory is a common feature to all computer filesystems, and directory operations are familiar to most computer users, the system and method of the present invention have many advantages over prior arts, in regard to developing and managing applications, including being able to easily and conveniently customize an application without the need for any vendor-specific tools.

Through using module-implementation definition, an abstract layer between a module and a runtime, both the module and the runtime can be independently implemented, it potentially allows an application to be developed using modules from different implementations, from different vendors and using different technologies, at the same time, and allow applications can be run by compatible runtimes.

Although the description above contains many specificities, these should not be construed as limiting the scope of the invention but as merely providing illustrations of some of the presently preferred embodiments of this invention. For example, there can be embodiments where the modules of an application are geographically distributed, and the directories can be related through many kinds of technologies such as the Web Services.

Thus the scope of the invention should be determined by the appended claims and their legal equivalents, rather than by the given examples.

I claim:

1. A computer-implemented method for building a modularized system using file-directory hierarchy, the method comprising:
   a) Creating a plurality of file-directory folders in a computer storage media, each of said plurality of file-directory folders storing a corresponding module and instructions for implementing a task of said corresponding module;
   b) Defining a file-directory hierarchy relationship between at least two or more of said plurality of file-directory folders; wherein said file-directory hierarchy relationship comprising the implementation details of the tasks and the inter-connection of the inter-module communications of the corresponding modules of said at least two or more of said plurality of file-directory folders;
   c) Storing said file-directory hierarchy relationship in a memory;
   d) Obtaining said file-directory hierarchy relationship from the memory and translating said file-directory hierarchy relationship into a computer-executable instruction;
   e) Receiving an input by an input module, wherein said input module is selected from the corresponding modules of said at least two or more of said plurality of file-directory folders;

f) Processing, by a hardware processor, said input by performing said the tasks of the corresponding modules of said at least two or more of said plurality of file-directory folders by executing said computer-executable instruction with said input; and g) In response to the processing by said hardware processor, generating an output by an output module, wherein said output module is selected from the corresponding modules of said at least two or more of said plurality of file-directory folders.

2. The computer-implemented method of claim 1 wherein said input is data read from a first computer file.

3. The computer-implemented method of claim 1 wherein said output is data written to a second computer file.

* * * * *